United States Patent
Bäker et al.

(10) Patent No.: US 6,246,313 B1
(45) Date of Patent: Jun. 12, 2001

(54) METHOD AND DEVICE FOR OPERATING A BRAKING DEVICE IN MOTOR VEHICLES

(75) Inventors: Wolfgang Bäker, Braunschweig; Thomas Ruchatz, Lehre, both of (DE)

(73) Assignee: Volkswagen AG, Wolfburg/Fallersleben (DE)

( * ) Notice: Subject to any disclaimer, the term of this patent is extended or adjusted under 35 U.S.C. 154(b) by 0 days.

(21) Appl. No.: 09/362,935

(22) Filed: Jul. 28, 1999

(30) Foreign Application Priority Data

Jul. 29, 1998 (DE) .............................................. 198 34 126

(51) Int. Cl.$^7$ ....................................................... B60Q 1/25
(52) U.S. Cl. ...................... 340/425.5; 340/446; 340/453; 340/457.3
(58) Field of Search ................................. 340/425.5, 444, 340/446, 450.1, 453, 456, 457.3, 457.4, 463

(56) References Cited

U.S. PATENT DOCUMENTS

| | | | |
|---|---|---|---|
| 2,773,249 | 12/1956 | De Santis | 340/69 |
| 2,876,856 | 3/1959 | Greene | 180/82 |
| 3,723,968 | 3/1973 | Kelly | 340/69 |
| 4,495,484 | 1/1985 | Kawakatsu et al. | 340/52 D |
| 5,038,135 | 8/1991 | Jurkiewicz et al. | 340/457 |
| 5,340,202 | * 8/1994 | Day | 303/19 |
| 5,412,370 | * 5/1995 | Berman et al. | 340/426 |
| 5,505,528 | * 4/1996 | Hamman et al. | 303/89 |
| 5,586,812 | * 12/1996 | Kanjo et al. | 303/71 |
| 5,839,304 | * 11/1998 | Wills | 70/115 |
| 5,984,429 | * 11/1999 | Nell et al. | 303/113.4 |

FOREIGN PATENT DOCUMENTS

| | | | |
|---|---|---|---|
| 32 38 196 A1 | 4/1984 | (DE) | B60K/41/20 |
| 33 25 713 A1 | 1/1985 | (DE) | B60T/7/12 |
| 42 35 663 A1 | 6/1993 | (DE) | B60T/7/02 |
| 44 21 088 A1 | 10/1994 | (DE) | B60T/8/32 |
| 195 23 111 A1 | 1/1997 | (DE) | G05D/1/02 |
| 195 25 552 A1 | 1/1997 | (DE) | B60T/8/00 |
| 196 19 641 C1 | 8/1997 | (DE) | B60T/7/12 |

* cited by examiner

*Primary Examiner*—Jeffrey Hofsass
*Assistant Examiner*—Daniel Previl
(74) *Attorney, Agent, or Firm*—Kenyon & Kenyon

(57) ABSTRACT

The invention relates to a method and to a device for operating a braking system in motor vehicles including both a service brake and a parking brake in which an acoustic signal is given when the vehicle is held in the stopped condition exclusively by the service brake for a predetermined period of time, and further providing for integration of driver actions to prevent dangerous situations.

13 Claims, 2 Drawing Sheets

METHOD AND DEVICE FOR OPERATING A BRAKING DEVICE IN MOTOR VEHICLES

BACKGROUND OF THE INVENTION

The present invention relates to a method and device for operating a motor vehicle braking system, including service or foot brake and a parking or hand brake, in which an audible signal is given after the vehicle is held in the stopped condition exclusively by application of the service brake for a given period of time.

It is customary for two different braking systems to be used to brake motor vehicles. For the most part, a braking system includes the so-called service or foot brake which as already indicated by the term is used during the vehicle's driving operation. This brake, which is essentially operated by pressurized media and usually is equipped with a power assist, is used to brake or decelerate the vehicle during operation, or to briefly maintain the vehicle in a stationary condition, for example, when a vehicle is stopped at a traffic light or the like. In addition, in certain driving situations, a motor vehicle can be braked by the drag torque of the engine. This type of service brake operation information is included here to facilitate understanding of the subject matter of the present invention.

In addition, a so-called parking brake is provided in each motor vehicle to secure the vehicle in a stationary condition for extended periods of time, preventing it from rolling away, or, even more importantly, to maintain braking of the vehicle and safeguard it against rolling away, while in the parked or engine off state.

Often the service brake is applied to brake a vehicle over extended periods to keep the vehicle stopped; however, this is not normal operational use of the service brake.

Consequently, dangerous situations can arise, e.g., when the driver of a vehicle briefly leaves the vehicle, e.g., in a traffic jam, after applying the service brake only and forgetting to activate the parking brake. In such situations the vehicle can then set itself in motion automatically.

Situations of this kind become more problematic in vehicles equipped with automatic proximity-control systems, which enable the vehicle to continue to move automatically after a vehicle in front of it moves, i.e., even in the absence of the driver of the vehicle, for as long as the vehicle, i.e., the engine and the electric system, are in operation.

Moreover, even when the vehicle is shut off, all too often one forgets to activate the parking brake thereby unintentionally enabling the vehicle to roll away from the parked position.

From the related art, one can infer a number of operating methods, including, in particular, automatic hand brakes. From the German 44 21 088 Al, a braking system for motor vehicles is known, which includes an automatic hand brake that can be applied automatically as a function of the vehicle's driving state. To accomplish this two parameters are monitored. On the one hand, the accelerator gas pedal must be in the neutral position and, on the other hand, the velocity must be less than two km/h. In this case, however, the controlled application of this automatic hand brake is used merely as a so-called starting aid, and does not contribute to achieving the objective described above.

German Patent 33 257 13 Al, (USSN) discloses a braking device which is operated as a conventional braking device integrated into a proximity-control method.

German Patent 195 23 111 Al, (USSN) discloses an automatic brake which is integrated into a proximity-control system.

OBJECTS AND SUMMARY OF THE INVENTION

It is an object of the present invention to provide a method and device that alerts drivers to situations, resulting from prolonged braking with the service brake only, which are either undesirable from a technical standpoint and/or dangerous.

It is another object of the present invention to integrate the vehicle driver and a device for operating a braking system, in an operational method that prevents dangerous situations.

In a device operating in accordance with the present invention, starting from the instant of an executed stopping operation is initiated by applying the service brake and after a selected delay time $\Delta t$ has elapsed, an acoustic signal is triggered when the stop condition is being maintained exclusively by the service brake. Thus, e.g., the driver is made aware of the fact that the vehicle which is at rest has been held in that condition, beyond the aforesaid period of time, exclusively by the service brake. The driver is, therefore, prompted or reminded to use the parking brake for the stopping time that follows.

In another advantageous embodiment of the method according to the present invention, the above procedure is integrated into a proximity-control method. This means that additional sensor technology is provided for detecting whether another vehicle driver is putting his or her vehicle into gear again, e.g., in a traffic jam situation it can be detected whether the driver in the vehicle directly in front is actually putting his or her car quickly in motion again.

According to another advantageous embodiment of the method according to the present invention, when the method according to the present invention is integrated into a proximity-control method in the above manner, the service brake is automatically operated, i.e., as a function of the determined distance to the vehicle directly in front. In this context, a further refinement of the method according to the present invention can also provide that the parking brake be automatically set following a second selected delay time $\Delta t_2$, when, up until that point, the vehicle is kept at a standstill by the service brake. Thus, the above mentioned operation proceeds automatically.

Further embodiments relate to monitoring the vehicle driver. For this, links to open-door sensors or seat sensors can inform the system whether the vehicle driver is leaving the vehicle, e.g., with the parking brake not activated.

This means that when the driver of a running vehicle that is stopped has the intention of leaving the vehicle, and opens the door, or lifts himself up from the vehicle seat, an acoustic signal would alert him or her of the dangerous situation that has just occurred, i.e., failure to actuate the parking brake.

In this context, an appropriate device in accordance with the present invention contains a timing element and a tachosensor, which are interconnected so as to enable the acoustic signal to be transmitted in the manner described above.

In addition, other sensors may be provided for detecting the above mentioned situations.

In one aspect the present invention provides method for operating a braking system in a motor vehicle, having both a service brake and a parking brake, which comprises: starting from the instant of an executed stopping operation initiated by the service brake, and after a delay time $\Delta t$ has elapsed an acoustic signal is triggered when the stop condition has been maintained exclusively by the service brake.

In another aspect the present invention is integrated into a proximity-control system and preferably the integration into the proximity-control system provides for automatic actuation of the service brake. Preferably, the proximity-control system is of the ADR type.

In yet another aspect the present invention further comprises automatically setting the parking brake following a further delay time $\Delta t_2$, i.e., after $\Delta t$, when, up until that point, the vehicle is kept at a standstill by the service brake.

In yet another aspect the present invention provides for open door detection, e.g., when the door is opened by the driver of the vehicle, and preferably additional or alternative seat sensors are used to detect if the driver of the vehicle leaves the vehicle.

In yet another aspect the present invention provides a device for braking a motor vehicle having both a service brake and a parking brake comprising a timing element and a tachosensor that are connected so that, starting from the instant of an executed stopping operation initiated by the service brake, and after a delay time $\Delta t$ has elapsed, an acoustic signal is generated by a signal transmitter, e.g., acoustic warning sensor, when the stop condition has been maintained exclusively by the service brake.

In yet another aspect the present invention further comprises a logic processing unit, which includes the timing element and is connected to a first actuating sensor for the service brake and a second actuating sensor for the parking brake. Also, the logic processing unit can be wired to an open-door sensor and/or a seat sensor.

BRIEF DESCRIPTION OF THE DRAWINGS

The accompanying drawing is incorporated in and constitutes a part of the specification. Together with the general description given above and the detailed description of the preferred embodiments given below, the drawing serves to explain the principles of the invention.

DETAILED DESCRIPTION OF THE INVENTION

Figure 1:
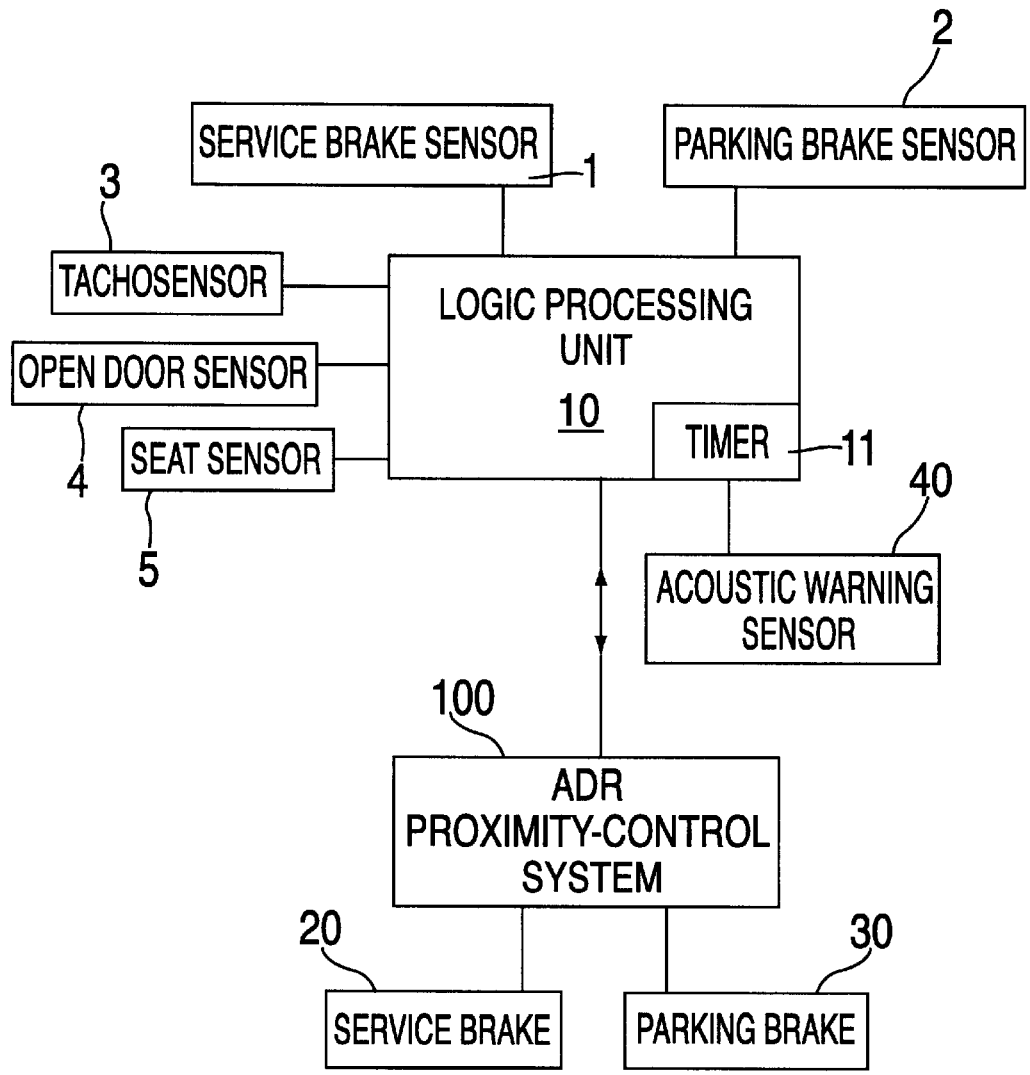
FIG. 1 is a schematic representation of a device for braking motor vehicles constructed in accordance with the present invention.

FIG. 1 shows how individual elements may be logically interconnected to construct a device in accordance with the present invention, though more evolved designs are possible. First, provision is made for actuating sensors of the following types: an actuating sensor 1 for the service brake, as well as an actuating sensor 2 for the parking brake. These are linked to a logic processing unit 10, which, based on the sensor signals, is able to detect whether the service brake and/or the parking brake is/are actuated. In this context, logic processing unit 10 can be linked to other sensors, which are further refined in terms of information technology, namely, for example, to a tachosensor 3, and open-door sensor 4, and to a seat sensor 5. Tachosensor 3 informs the logic processing unit whether the vehicle is stationary or is moving. This is important since only the service brake should be actuated when the vehicle is moving, and not the parking brake. Those situations where, for example, the vehicle driver leaves a vehicle that is still running and in operation are identified to logic processing unit 10, by open-door sensor 4 and/or seat sensor 5. A further analysis of a driver leaving a vehicle may, however, even include instances when a driver leaves a vehicle that is no longer in operation and forgets to actuate the parking brake, thereby prompting logic processing unit 10 to generate an acoustic warning signal.

In this context, the logic processing unit 10 is linked, for the most part downstream, to an acoustic warning sensor 40 which generates a warning signal in response to detection of the above situations. For this purpose, the logic processing unit 10 includes a timing element 11 so that an acoustic warning signal can be in response to the presence of signals from the seat sensor 5, open-door sensor 4, the tachosensor 3, etc., following a suitable time delay. In addition, however, service brake 20 and parking brake 30 can also be wired via a so-called ADR proximity-control system 100 to logic processing unit 10. The ADR system refers to the above-mentioned proximity-control system having the functioning methods described above with regard to generating an acoustic warning signal or automatically actuating both service brake 20, as well as parking brake 30.

Figure 2:
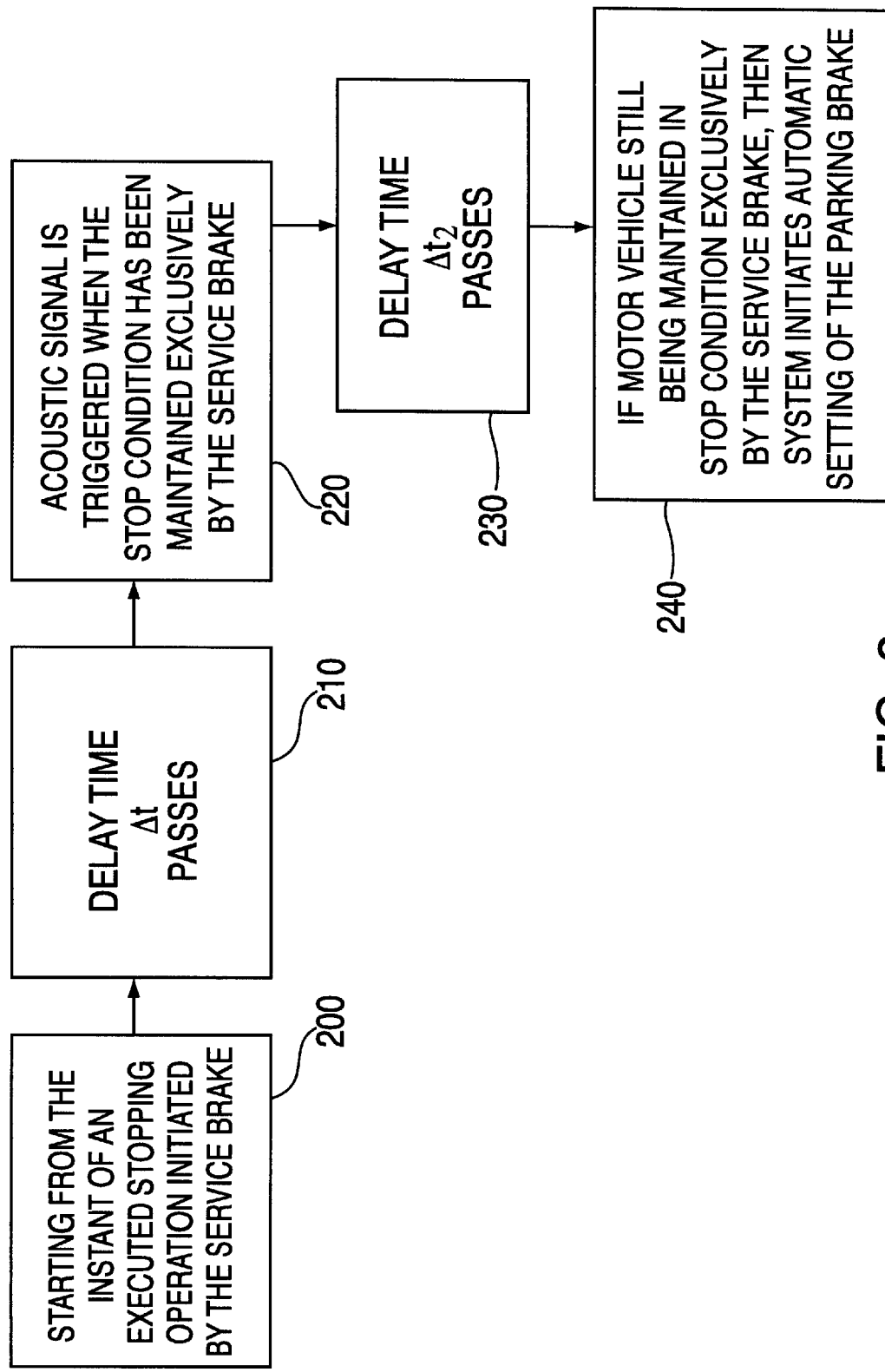
FIG. 2 is a flow diagram of one embodiment of the present invention.

FIG. 2 shows a flow diagram of one embodiment of the present invention. When the system of the present invention detects a stopping operation 200, and a delay time $\Delta t$ passes 210, the an acoustic signal is triggered when the stop condition has been maintained exclusively by the service brake 220. When a delay time $\Delta t_2$ passes 230, if the motor vehicle is still being maintained in stop condition exclusively by the service brake then system initiates automatic setting of the parking brake 240.

Overall, therefore, this system enhances driving safety, while integrating the driver of the vehicle, as well as those situations when the driver of the vehicle distances himself from the vehicle, and helps to prevent dangerous situations.

Additional advantages and modifications of the present invention will readily occur to persons skilled in the art. The invention in its broader aspects is not limited to the specific details described above. Departures may be made from such details without departing from the spirit or scope of the invention. The invention is limited only by the attached claims and their legal equivalents.

What is claimed is:

1. A method for operating a motor vehicle braking system that includes both a service brake and parking brake, comprising:

monitoring an executed stopping operation initiated by the service brake, the stopping operation causing a stop condition; and after a delay time $\Delta t$ has elapsed after the stopping operation is executed, triggering an acoustic signal when the stop condition has been maintained exclusively by the service brake.

2. The method as recited in claim 1, further comprising: providing a proximity-control system.

3. The method as recited in claim 2, further comprising: automatically actuating the service brake using the proximity-control system.

4. The method as recited in claim 1, 2 or 3, further comprising:

automatically actuating the parking brake following a second delay time $\Delta t_2$, during which the stop condition has been maintained exclusively by the service brake.

5. The method as recited in claim 1, 2 or 3, further comprising:

detecting when a driver's door is opened; and if the driver's door is opened and the stop condition has been maintained exclusively by the service brake, triggering the acoustic signal.

6. The method as recited in claim 1, 2 or 3, further comprising:

detecting when a driver of the vehicle leaves a vehicle seat; and if the driver of the vehicle leaves the vehicle and the so condition has been maintained exclusively by the service brake, triggering the acoustic signal.

7. An arrangement in a braking system for a motor vehicle having both a service brake and a parking brake, comprising:

a tachosensor detecting if the motor vehicle is moving or stationary;

a timing element; and an acoustic warning device, the tachosensor, the timing element and the acoustic warning device being coupled so that starting from the instant of an executed stopping operation initiated by the service brake, and after a delay time Δt has elapsed as measured by the timer, an acoustic warning signal is transmitted via an acoustic warning device when a stop condition has been maintained exclusively by the service brake, the stopping operation causing the stop condition.

8. The arrangement as recited in claim 7, further comprising:

a logic processing unit which includes the timing element;

an actuating sensor for the service brake coupled to the logic processing unit to for detecting whether service brake is actuated; and an actuating sensor for the parking brake coupled to the logic processing unit to detect whether the parking brake is actuated.

9. The arrangement as recited in claim 8, wherein:

the logic processing unit is connected to an open-door sensor, the open-door sensor detecting when a door is opened, the logic processing unit configured to trigger the acoustic warning device if the door is opened and the stop condition has been maintained exclusively by the service brake.

10. The arrangement as recited in claim 8 or 9, wherein:

the logic processing unit is connected to a seat sensor, the seat sensor detecting whether a seat is occupied, the logic processing unit configured to trigger the acoustic warning device if the seat is not occupied and the stop condition has been maintained exclusively by the service brake.

11. A method for operating a vehicle braking system that includes both a parking brake and a service brake, which comprises:

measuring a period of time the vehicle is held in a stopped condition exclusively by application of the service brake; and sounding an acoustic signal when the measured period of time equals a predetermined value Δt.

12. An arrangement for operating a braking system in a vehicle that includes a parking brake and a service brake, comprising:

a logic processing unit;

a service brake actuating sensor connected to the logic processing unit;

a parking brake actuating sensor connected to the logic processing unit;

A tachosensor for monitoring movement of the vehicle;

a timer for measuring the time during which the vehicle is held in a stop condition exclusively by the service brake, the stopped condition being detected using the tachosensor; and a transmitter for sounding an acoustic signal when the measured time equals a predetermined value Δt.

13. A method for providing an alarm signal to a driver of a motor vehicle, the motor vehicle including a braking system including a service brake and a parking brake, comprising:

sensing an initial activation of an operation of the service brake;

activating a timer when the service brake is activated; and triggering an acoustic signal if the operation of the service brake is maintained for more than a predetermined time period and the parking brake has not been activated during the predetermined time period.

* * * * *